(12) United States Patent
Borras et al.

(10) Patent No.: US 11,989,955 B2
(45) Date of Patent: May 21, 2024

(54) METHOD AND SYSTEM FOR REDUCING MANUAL REVIEW OF LICENSE PLATE IMAGES FOR ASSESSING TOLL CHARGES

(71) Applicant: GEOTOLL, INC., Plantation, FL (US)

(72) Inventors: Jaime Andres Borras, Miramar, FL (US); Wyatt Drake Geist, Davie, FL (US)

(73) Assignee: GEOTOLL, INC., Plantation, FL (US)

( * ) Notice: Subject to any disclaimer, the term of this patent is extended or adjusted under 35 U.S.C. 154(b) by 0 days.

(21) Appl. No.: 18/223,436

(22) Filed: Jul. 18, 2023

(65) Prior Publication Data

US 2023/0410539 A1 Dec. 21, 2023

Related U.S. Application Data

(63) Continuation of application No. 18/092,819, filed on Jan. 3, 2023, now Pat. No. 11,704,914, which is a continuation-in-part of application No. 17/368,323, filed on Jul. 6, 2021, now Pat. No. 11,544,942.

(60) Provisional application No. 63/048,245, filed on Jul. 6, 2020.

(51) Int. Cl.
| | |
|---|---|
| *G06V 20/62* | (2022.01) |
| *G01C 21/34* | (2006.01) |
| *G06V 20/20* | (2022.01) |
| *H04W 4/021* | (2018.01) |

(52) U.S. Cl.
CPC .......... *G06V 20/62* (2022.01); *G01C 21/3461* (2013.01); *G06V 20/20* (2022.01); *H04W 4/021* (2013.01)

(58) Field of Classification Search
CPC . G06K 9/325; G06K 9/00671; G01C 21/3461
See application file for complete search history.

(56) References Cited

U.S. PATENT DOCUMENTS

| | | |
|---|---|---|
| 5,708,425 A | 1/1998 | Dwyer et al. |
| 2003/0201878 A1 | 10/2003 | Bai et al. |
| 2007/0285809 A1 | 12/2007 | Takahashi |
| 2011/0136468 A1 | 6/2011 | McNamara et al. |
| 2012/0229304 A1 | 9/2012 | Dalal |
| 2014/0218291 A1 | 8/2014 | Kirk |
| 2016/0012648 A1 | 1/2016 | Fustes |
| 2016/0209219 A1 | 7/2016 | Grush et al. |
| 2018/0122152 A1 | 5/2018 | Shin |
| 2021/0183169 A1 | 6/2021 | Borras et al. |

*Primary Examiner* — Sam Bhattacharya
(74) *Attorney, Agent, or Firm* — The Concept Law Group, PA; Scott M. Garrett; Scott D. Smiley

(57) ABSTRACT

A tolling system is operable to reduce the number of manual reviews of a toll point images needed to process toll fee charges by separately reporting from both toll points and mobile device in vehicles running a tolling application program the lane and crossing time when traversing a toll point. A tolling service can match records produced by the toll points with records providing by the mobile device when the toll point cannot immediately determine the identity of the toll customer passing through the toll point.

6 Claims, 10 Drawing Sheets

METHOD AND SYSTEM FOR REDUCING MANUAL REVIEW OF LICENSE PLATE IMAGES FOR ASSESSING TOLL CHARGES

CROSS-REFERENCE TO RELATED APPLICATION

This application is a continuation of U.S. patent application Ser. No. 18/092,819 filed Jan. 3, 2023 and granted as U.S. Pat. No. 11,704,914 and which was a continuation in part of U.S. patent application Ser. No. 17/368,323, filed on Jul. 6, 2021 and issued as U.S. Pat. No. 11,544,942 on Jan. 3, 2023, and through that application further claims priority to U.S. Provisional Patent Application No. 63/048,245 filed Jul. 6, 2020, the entirety of which is incorporated by reference. And through the Ser. No. 17/368,323 application this application further claims priority to U.S. patent application Ser. No. 16/237,070, filed Dec. 31, 2018, and through that application to U.S. Provisional Patent Application No. 62/611,973, filed Dec. 29, 2017, the entireties of each of which are hereby incorporated by reference.

FIELD OF THE INVENTION

The present invention relates generally to toll systems for automated "toll by plate" charging, and, more particularly, relates to reducing the amount of manual image review necessary to identify a vehicle license plate number that has been captured in an image while passing through a tolling location in order to assess a toll charge to the correct entity.

BACKGROUND OF THE INVENTION

Many toll systems operated on toll roadways have stopped using toll booths, where a driver has to pay in cash, and instead use in-vehicle toll transponders and "toll by plate" systems in order to avoid creating traffic back-ups. A toll transponder uses radio communication to communicate with a toll reader when passing through a tolling location. Typically the toll reader is mounted on a gantry over a particular lane of traffic at a toll plaza or tolling location, where each lane has its own corresponding toll reader. The information transmitted by the in-vehicle toll transponder to the toll reader allows the toll system to charge a toll to the associated party (e.g. the owner of the vehicle). Often, however, a vehicle may not have a toll transponder, or there may be an error that prevents a toll transponder from being read, or the toll transponder may unknowingly be inoperative for various reasons.

To address the problem of not receiving any signal from a toll transponder when a vehicle passes through a tolling location (e.g. past a toll reader), a toll fee can be assessed based on the license plate number of the vehicle. As the vehicle passes through a tolling location, a high speed camera captures an image of the rear of the vehicle, which includes the license tag. When no toll transponder signal is received from a vehicle, or in systems that use "toll by plate" as the primary means of assessing toll, the captured image is processed using character recognition to automatically obtain the vehicle license tag number from the image. If that process is successful, then the toll can be charged to the owner of the vehicle. For example, the license tag number can be cross referenced with those vehicles registered with the toll system to find a match. If no match is found then the state motor vehicle records can be used to identify the owner and issue an invoice to the owner of the vehicle.

However, the automated image recognition process has a high rate of error, where the automated process is unable to determine the license plate number, to a required degree of confidence, in a given image. This is because of the vast number of specialty plate designs provided by states. In Florida alone vehicle owners can select from over one hundred different plate designs, each with unique graphics and artwork. In addition to the plates used in state, the toll systems must also recognize out-of-state plates. As a result, manual review is often necessary to identify the license tag number in an image. According to the Florida Dept. of Transportation, as many as 140 million toll by plate transactions need to be manually reviewed in a given year, which is approximately 42% of all toll by plate transactions in the state. This represents a substantial cost and loss of revenue.

The conventional method of determining whom to charge a toll fee to, based on a license tag or plate number, is shown in FIG. 1. FIG. 1 is a flow chart diagram of a presently used (prior art) method 100 of assessing a toll. Initially, in step 102, a sensor such as a road loop (magnetic sensor) detects the approach of a vehicle at a tolling location. In response, in step 104 a lane camera is turned on, and in step 106 an attempt is made to receive a response from a toll transponder in the vehicle as it passes the tolling location. If a transponder signal is received, then in step 116 the image(s) recorded by the camera can be discarded and in steps 118, 120 the toll transaction processed. If in step 106 no toll transponder signal is received, then in step 108 an optical character recognition (OCR) process is performed on the captured image(s), or a best image can be selected for OCR and the OCR process performed. The OCR process attempts to identify the vehicle license plate in the image, and then to recognize the characters on the license plate. If the characters can be recognized, then in step 110 the license plate number (or tag number) is compared to a whitelist of vehicles that are registered (e.g. have toll accounts set up) with the toll agency. About 70% of OCR attempts are successful in resolving the characters and finding a match, and the associated account is then charged the toll in step 120. The other 30% that are not found in the white lists are checked in step 112 to see if the OCR process indicates trouble with recognizing one or more characters, and if not, then in step 122 the matter can be submitted to the DMV for identification of the vehicle's owner, then in step 124 issuance of an invoice and violation letter can be sent by the tolling agency to the registered owner of the vehicle. In instances in step 112 where the confidence of the OCR process is below the required threshold, or one or more characters could not be recognized, in step 114 a manual review is necessary to identify the characters, and the whitelist process is performed again assuming the unidentifiable characters can be discerned by the human operator. As mentioned, this process results in hundreds of millions of manual reviews for some states, which is tedious and costly to perform.

Therefore, a need exists to overcome the problems with the prior art as discussed above.

SUMMARY OF THE INVENTION

In accordance with some embodiments of the inventive disclosure, there is provided a method for avoiding manual image review to determine an identity of a toll subscriber that includes, at a mobile device associated with a vehicle, determining, based on a location of the mobile device, that the vehicle has entered a local geofenced zone of a tolling location on a toll roadway, responsive to determining that the vehicle has entered the local geofenced zone, determining a geofenced lane in which the vehicle is traveling, determining a time, based on a location determination by the mobile device while in the geofenced lane, at which the vehicle crosses an imaging location in the geofenced lane, and transmitting to a tolling server a message including data indicating the time and lane at which the vehicle crossed the imaging location in the geofenced lane.

In accordance with a further feature, the method further includes, at a tolling server, attempting to recognize a license plate in an image taken by a toll camera at the tolling location of the imaging location at the time, and failing to recognize the license plate in the image, correlating the data in the message sent by the mobile device with the image taken by the toll camera, and determining, based on the time and location, that license plate belongs to the vehicle associated with the mobile device.

In accordance with a further feature, the method further includes assessing a toll to an account associated with the vehicle.

In accordance with a further feature, determining the time, based on location determination by the mobile device while in the geofenced lane comprises, in response to determining that the vehicle is in the geofenced lane, increasing a rate at which location determinations are made, performing a plurality of location determinations at the increased rate while in the geofenced lane, determining one of the plurality of location determinations to be a location closest to the imaging location, determining a time offset based on a speed of the vehicle and a distance between the location of the one of the plurality of location determinations and the imaging location, and applying the time offset to the time at which the one of the plurality of location determinations was made.

In accordance with a further feature, the geofenced lane in which the vehicle is traveling comprises sensing lateral acceleration changes to detect one or more lane changes.

In accordance with some embodiments of the inventive disclosure, there is provided a method for reducing the need for automatic license plate recognition at a tolling location that includes failing to receive a toll transponder response at a toll reader of a tolling location upon a vehicle passing through the tolling location, receiving, at a server of a toll agency from a plurality of mobile device, a plurality of toll event log message indicating a time and lane location of passing through the tolling location, responsive to failing to receive the toll transponder response, determining that one of the plurality of toll event log messages include a corresponding lane location and time value matching that of the vehicle passing through the tolling location, and assessing a toll to an account associated with the vehicle.

In accordance with a further feature, the method further includes capturing an image of the vehicle at the tolling location, responsive to failing to receive the toll transponder response, attempting to recognize a license tag number in the image to compare the license tag number with a whitelist of toll accounts, and determining that the license tag number cannot be completely recognized.

In accordance with a further feature, capturing the image is performed using one camera that covers a plurality of toll lanes at the tolling location.

Although the invention is illustrated and described herein as embodied in a tolling system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
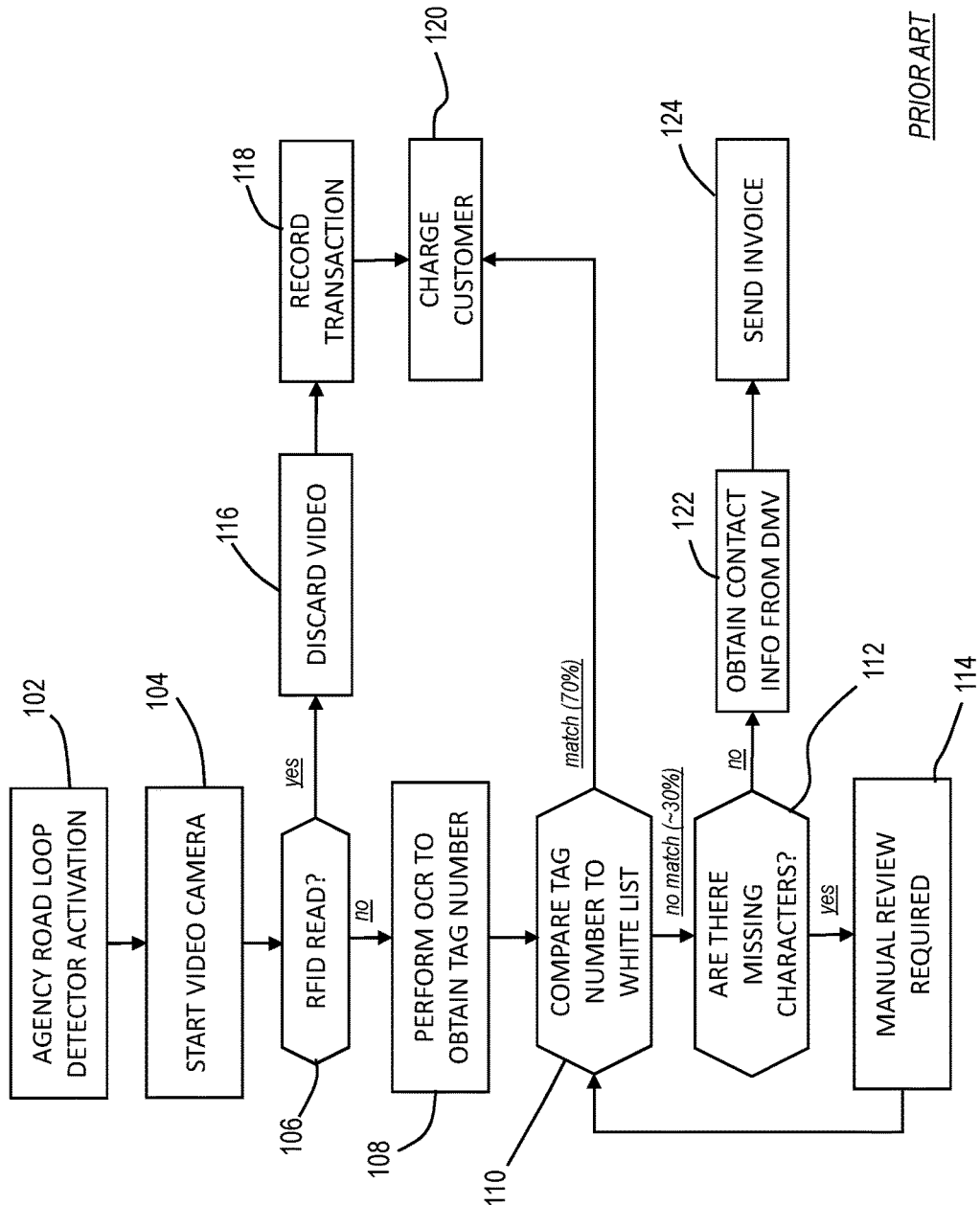
FIG. 1 is a flow chart diagram of a presently used (prior art) method of assessing a toll.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2A:
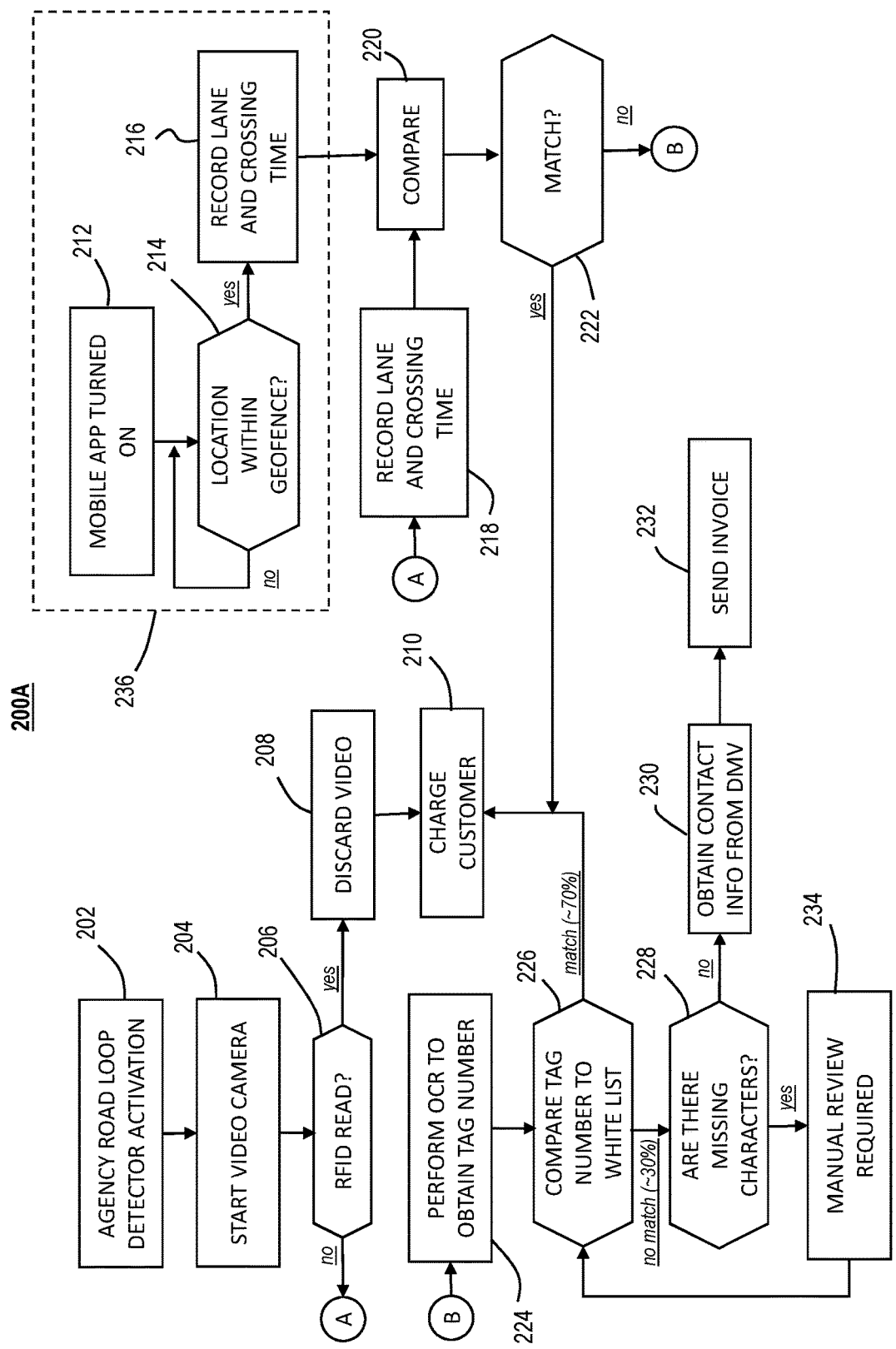
FIG. 2A is a flow chart diagram of an inventive method for assessing a toll, in accordance with some embodiments.
Figure 2B:
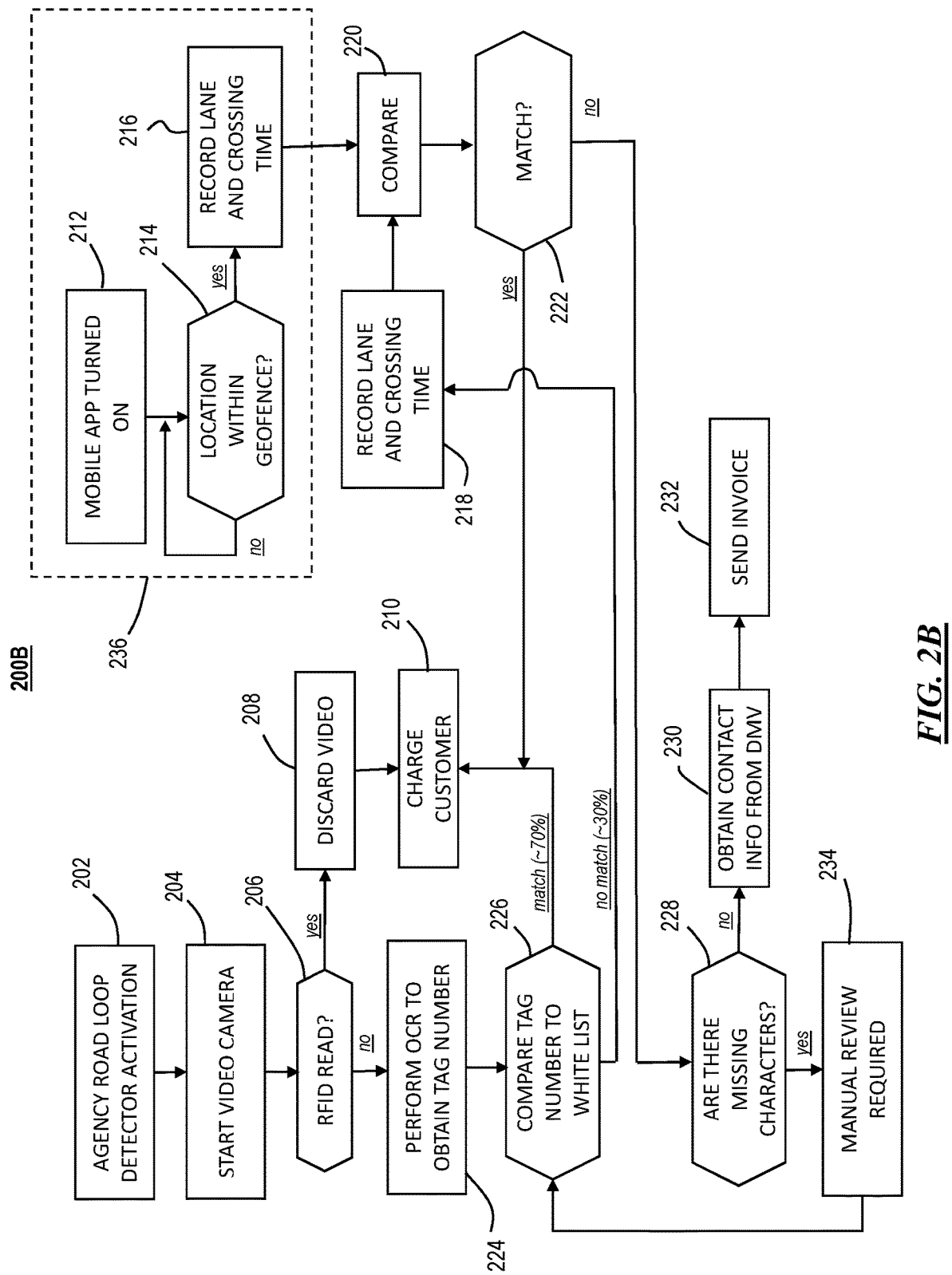
FIG. 2B is a flow chart diagram of an inventive method for assessing a toll, in accordance with some embodiments.

FIGS. 2A and 2B show flow chart diagrams of alternative methods for assessing a toll, in accordance with some embodiments. The inventive methods modify the prior art process (e.g. of FIG. 1) by having the vehicle operator's mobile device report the time and location (e.g. the specific lane or gantry) of passing through tolling location to a tolling agency or processor. This information can be used prior to performing the OCR process. At the mobile device, the mobile device is provided with a tolling application program ("tolling app" for short) which has access to the resources of the mobile device such as the satellite location receiver system, an inertial sensor, as well as communication systems. When the tolling app is enabled, it periodically checks the location of the mobile device by accessing the location data (location "fixes") output of the satellite location system of the mobile device. The location of the mobile device is assumed to be the location of the vehicle in the method. Initially the location fixes are taken at a slow rate. The most recent location fix (indicating the most recent location) is compared to known geofenced regions which are defined around tolling locations. The geofenced regions can be layered, meaning there can be geofenced regions defined over, or within other geofenced regions, and each geofenced region can be used to trigger the tolling app to undertake particular operations or modify particular operations.

Accordingly, method 200A of FIG. 2A begins at two places. First, in box 236 the mobile device is enabled and running the tolling app in step 212, and in process 214 the tolling application is initially periodically checking the present location, as indicated by the on-board satellite positioning receiver system, against various geofenced regions corresponding to tolling locations. Initially, while the present location indicates that the mobile device/vehicle are not in any tolling geofenced region, the location sampling is performed at a base rate. However, when the present location indicates that the present location is within a geofenced region for a tolling location, the location sampling rate can be increased.

Figure 3:
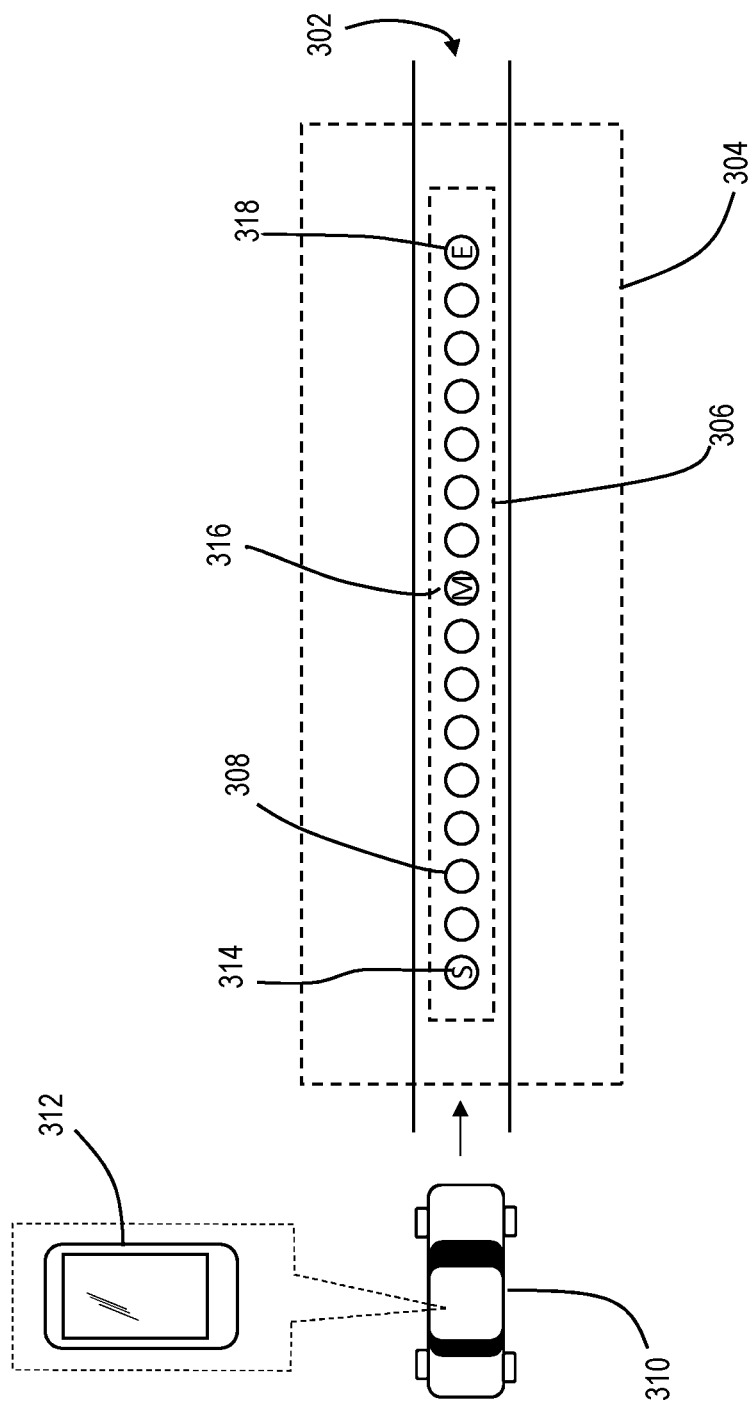
FIG. 3 is a geofencing arrangement for defining a local tolling location geofence and a toll lane geofence, in accordance with some embodiments.

For example, as shown in FIG. 3, a vehicle 310 in which a mobile device 312 is located which is running a tolling app approached a tolling location that is within a first geofenced region 304. Upon entering geofenced region 304 the location sampling rate of the tolling app is increased from a base rate to an increased rate (e.g. every 200 meters). As the vehicle approaches a tolling point, which can be a gantry, a second geofenced region 306 is defined over a particular lane 302. Each lane passing through the tolling location is within the first geofenced region 304 and has its own separate lane geofence (e.g. 306). Once the vehicle 310 enters the lane geofence 306, the location sampling rate is again increased to, for example, every five meters, however the design of the mobile device 312 may dictate the fastest rate at which location can be sampled. The circles 308 within the lane geofence 306 represent examples of location points at which location fixes are acquired by the mobile device. There are three important locations; a start "S" 314, a middle "M" 316, and an end "E" 318. At the start 314 the location sampling rate is increased to the rate preferred for the lane geofence 306. The middle 316 generally indicated the precise tolling point, and the end 318 indicates when the location sampling rate can be reduced. Note that the tolling location geofence 304 may extend, for example, half a mile or one kilometer before and after the tolling point, which the lane geofences (e.g. 306) may extend one hundred to two hundred meters before and after the tolling point.

As described, the local tolling geofence 304 is defined in an area preceding and around the tolling location. When the vehicle 310 passes the tolling location a toll charge is assessed to the vehicle owner's account. Once the tolling app determines the location is within the local geofence region 304, the location sampling rate is increased from a base location sampling rate to detect when the vehicle 310 is in a particular lane geofence 306. Each lane has its own geofence with a defined start ("S") 314, midpoint ("M") 316, and end or exit ("E") 318, which are known locations associated with the geofence definition for the lane geofence 306. Once the tolling app determines that the location is within a lane geofence 306, the location sampling rate is increased again to take location fixes every five meters, for example. Since each location fix includes a very accurate time, the speed of the vehicle can be determined. The midpoint "M" 316 in the traffic lane geofence 306 can be located at the same point of an imaging location that is in the center of view of a camera for the traffic lane in the gantry. The camera is used to capture an image of each vehicle's license plate or tag. The tolling app causes the mobile device 312 to determine the time at which it was at the midpoint "M" 316 location by determining which location fix was closest to the midpoint location 316, and determining a time offset of that location from the midpoint 316 based on the speed of the vehicle. The time offset can then be applied to the time of the closest location fix to determine the time, to sub-second accuracy, at which the vehicle was at the midpoint 316. This is called the midpoint crossing time, or imaging point crossing time. The crossing time and lane identifier can be determined and recorded in process 216 and provided to the tolling system in the method of FIGS. 2A and 2B.

Returning to FIG. 2A, separate from the tolling app operation in box 236, as the vehicle approaches the tolling point, there is generally a vehicle detection mechanism for each lane passing through the tolling point that allows the toll reader and camera for the specific lane to be activated. For example, in step 202 the approaching vehicle can be detected using a magnetic sensing loop in the lane ahead of the toll gantry. In response to detecting approaching vehicle, the video camera for the specific lane is enabled in state 204. In step 206 the toll reader attempts to read a toll transponder in the vehicle as it passes under the gantry. At the same time the camera produces one or more images of the rear of the vehicle as it passes the midpoint (e.g. 316). If an authorized toll transponder responds then in step 208 the image(s)/video can be discarded and in step 210 the toll customer is charged the toll fee.

However, if in step 206 no toll transponder responded, then the method proceeds to step 218 as indicates by the "A" process continuators. In step 218 the tolling system has received from mobile devices time and lane information for toll points that have been passed by the mobile device/vehicle. Likewise, the tolling system knows the time at which the image was captured as a result of step 204, and the lane associated with the camera that collected the image(s)/video. In step 220 the tolling system compares the crossing time and lane information received from mobile device with the image time and lane information from the toll gantry. If a match is found in step 222, then the customer whose mobile device transmitted the crossing time and lane information is charged the toll fee (step 210). If no match is found in step 222, then, following the "B" continuator the method proceeds to step 224 where a conventional OCR process is applied to the image(s)/video captured at the gantry camera to obtain a license tag number. In step 226 the acquired license tag number is compared to a list of authorized accounts and if a suitable match is found then the associated customer is charged (step 210). The suitable match must have a certain confidence level, as indicated, for example, in step 110 of FIG. 1. The confidence required is that the OCR process is at least 70% correct in some embodiments. If no match is found in step 226, then in step 228 it is determined if there are missing characters, or characters that could not be identified by the OCR process in step 224. If there are no missing characters, then the tolling system automatically obtains owner information from the motor vehicle registry and issues an invoice letter in step 232 to the registered owner of the vehicle. However is there are characters that were not identified, then in step 234 a manual review process is conducted in which a person looks at the image(s)/video to determine the license tag number, upon which the method returns to step 226. In some embodiments, in step 222 is there is no match found, then instead of proceeding to step 228, the location information and crossing time determined by the mobile device can instead be used to directly bill the toll user in step 223.

The method 200B of FIG. 2B is similar to that of method 200A; all of the same processes are conducted, but in a slightly different arrangement. In method 200B the method proceeds to step 218 from step 226 when no match can be found, rather than from step 206 if no toll transponder replies to the toll reader. Then in step 222, if not match is found for the crossing time/lane information, then the method 200B returns to step 228 to reevaluate the license plate number and determine if all of the characters were properly read by the OCR process of step 224. By using the crossing time and lane information transmitted to the tolling system (e.g. a server or data center of the toll system operator or toll account operator), the need to conduct resource intensive manual reviews of gantry camera images can be greatly reduced. Further, equipment cost and operational savings may be available by using a single high speed wide lens camera to capture images across more than one lane. As the number of tolling subscribers increase, tolling agencies can even eliminate the manual review process.

Figure 2C:
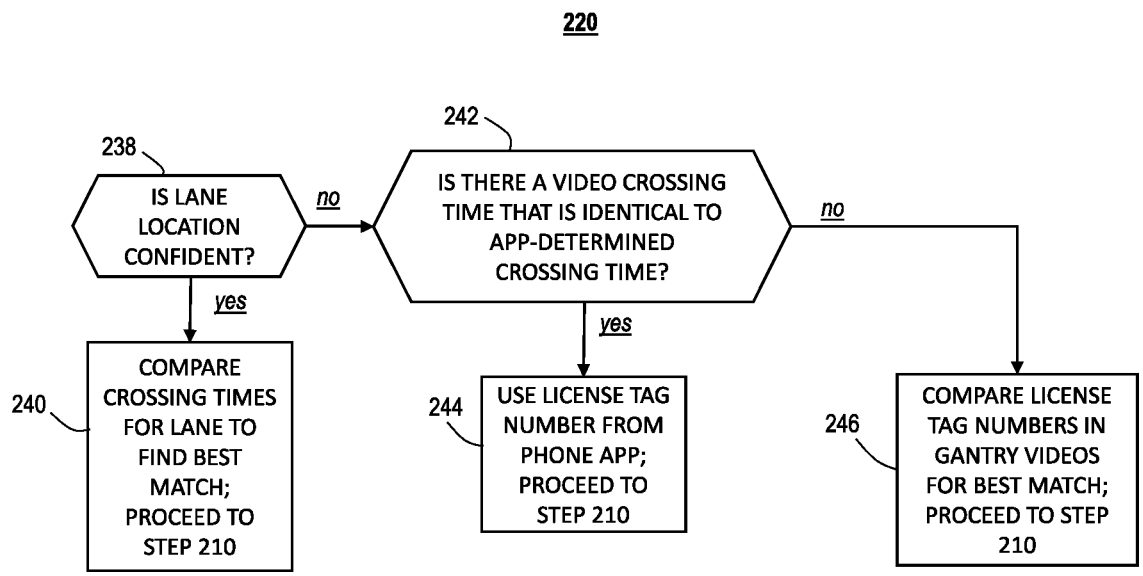
FIG. 2C shows an alternate method of matching gantry and phone app information for identifying a toll event, in accordance with some embodiments.

FIG. 2C shows an alternate method of matching gantry and phone app information for identifying a toll event, in accordance with some embodiments. In particular, steps 220 and 222 of FIGS. 2A & 2B can be modified as shown here to further reduce the need for manual review and automate the billing process for toll events. In step 238 the method can determine if the location information can reliably indicate the lane that vehicle was in upon crossing the tolling location, and in particular the mid-point of the lane geofence, or imaging point of the gantry camera. For example, if the location fixes are all consistently in the same lane, then it can be assumed that the vehicle was in that lane when crossing the tolling location. When the lane location data is likely correct, then in step 240 the system can simply compare crossing times of vehicles photographed crossing the tolling location in that lane and identify the closest match and assume it is the same vehicle.

However, in some cases, location information may be less consistent, or the vehicle may have been changing lanes while crossing the tolling location. When the lane location is not confidently known (by the mobile device), then in step 242 the crossing times of vehicles crossing the tolling location at about the same time are compared with the crossing time determined by the mobile device (including use of interpolation). Is there is a sufficient match in crossing time, then it can be assumed to be the same vehicle, and the method proceeds to step 244 in which the license tag information stored in the mobile device is used to bill the toll user. If in step 242 there isn't a sufficiently identical crossing time, then license tag numbers of vehicles recorded by the gantry cameras are compared to the license tag information of the toll user's vehicle, as stored in the mobile device. Even if only some of the license tag characters are known, the best match is assumed to be the same vehicle, and the toll user is charged accordingly.

Figure 4:
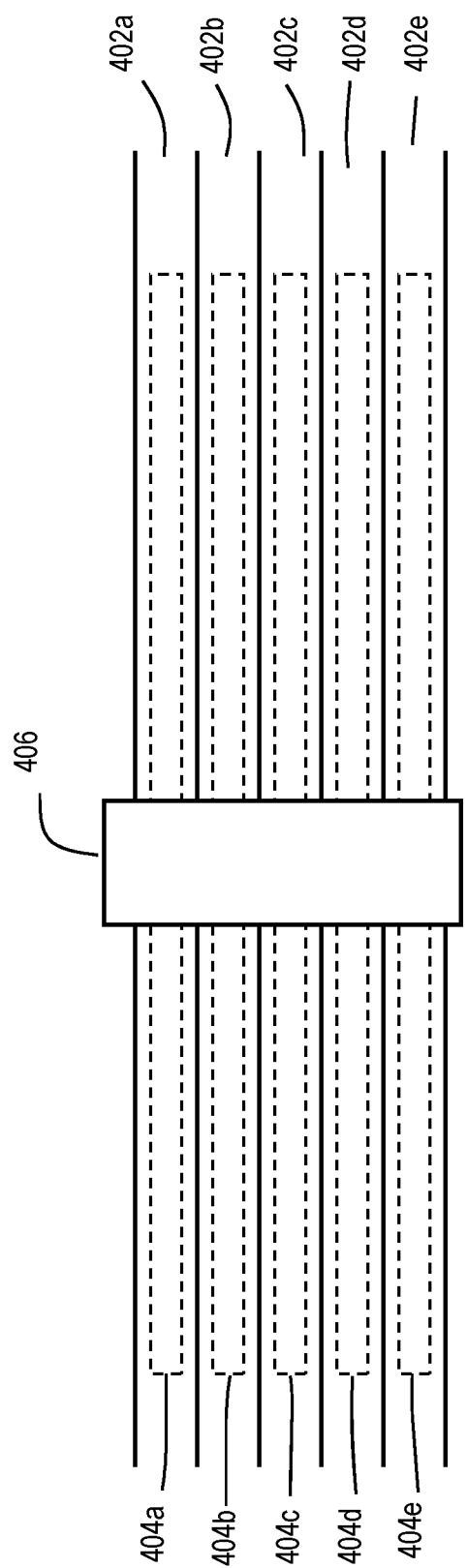
FIG. 4 is a lane diagram showing an arrangement where each lane of traffic is maintained through a tolling location.

FIG. 4 is a lane diagram showing an arrangement where each lane of traffic is maintained through a tolling location. This figure shows multiple lanes 402a-402e, as is common in many tolling locations (i.e. tolling plazas). Since location readings can be imprecise, the mobile device can use a statistical determination to determine which lane the vehicle is traveling in. That is, each location fix can be mapped to a lane, and whichever lane has the most location fixes will be determined to be the lane in which the vehicle is traveling. The lanes are defined by lane geofences 404a-404e. Each lane 402a-402e pass through a tolling point such a tolling gantry 406. Each of the lane geofences 404a-404e are within a larger geofence for the tolling point.

Figure 5:
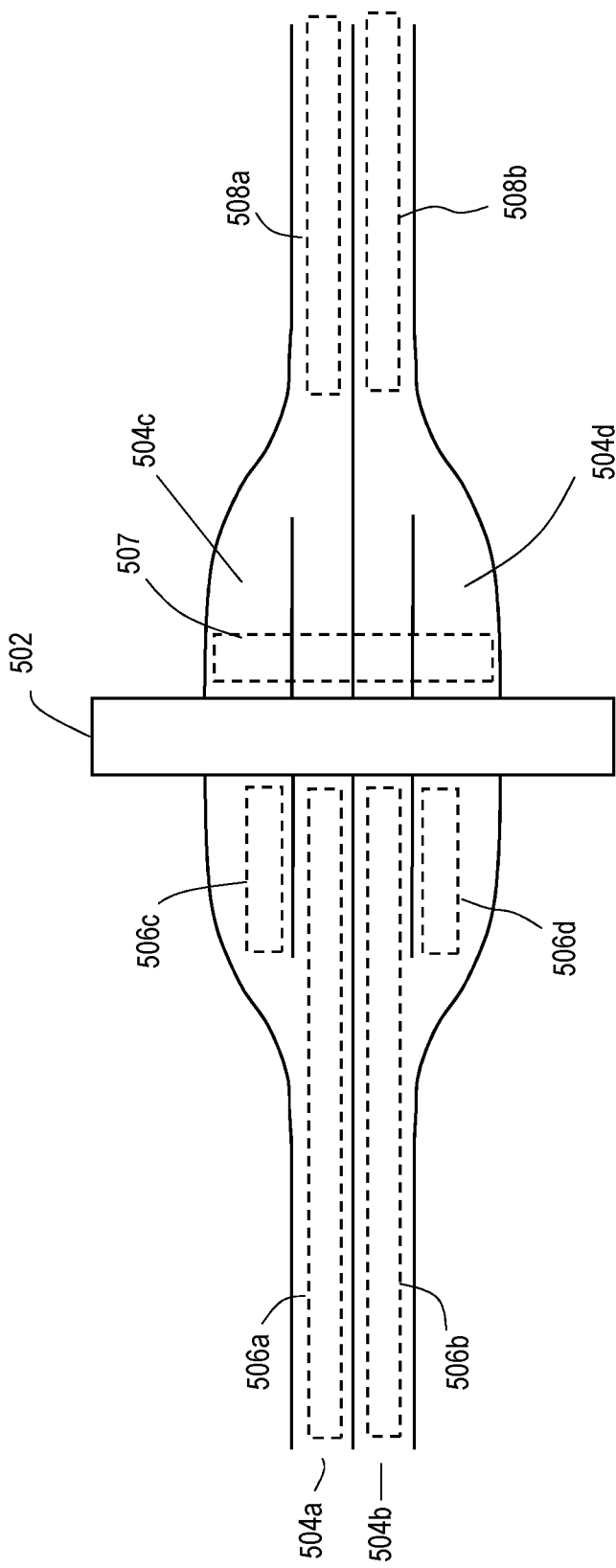
FIG. 5 is a lane diagram showing an arrangement where several traffic lanes are expanded into addition toll lanes to pass through a tolling location, and the geofence definitions to identify the expanded lanes, in accordance with some embodiments.

FIG. 5 is a lane diagram showing an arrangement where several traffic lanes are expanded into additional toll lanes to pass through a tolling location 502. For example, lanes 504a, 504b are expanded from two to four lanes at the tolling location 502. Lane geofences 506a, 506b are defined over main lanes 504a, 504b, and lane geofences 506c, 506d are defined over the additional expansion lanes prior to the tolling point 502. Crossing point 507 is a geofence defined past the tolling point 502 where vehicles are location when the images are taken by the gantry cameras and represents the point in each lane that is used as the reference for determining crossing time. Lane geofences 508a, 508b represent the exits of the toll lanes.

To determine which lane the vehicle is in when it crosses the crossing point 507, the location fixes taken along the toll lanes are usually indicative of the lane the vehicle was in as it passed through the crossing point 507, but the number of location fixes in geofences 506c, 506d may be a minority of location fixes. Accordingly, inertial changes indicative of a lane change can also be used. The inertial measurements can be obtained from a combination of the output of a multi axis accelerometer, compass, and locations. The compass of the mobile device indicates its orientation relative to the movement of the vehicle as a reference for determining "right" and "left" for lane change determination.

Figure 6B:
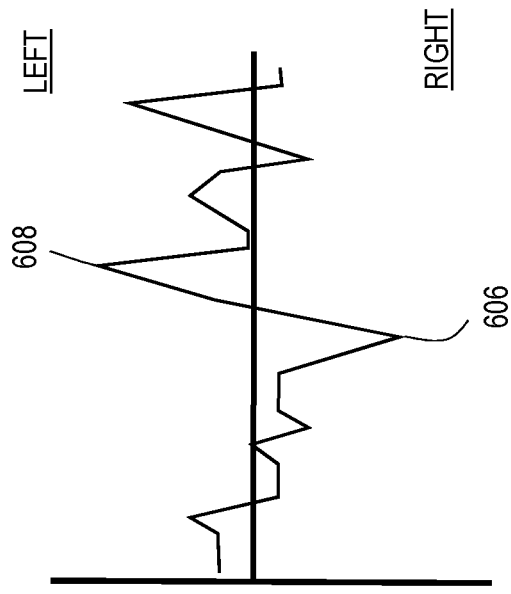
FIGS. 6A and 6B are an acceleration charts showing acceleration graphs as produced by an inertial measurement unit for determining lane changes by a vehicle while in toll lanes and while approaching a tolling location, in accordance with some embodiments.
Figure 6A:
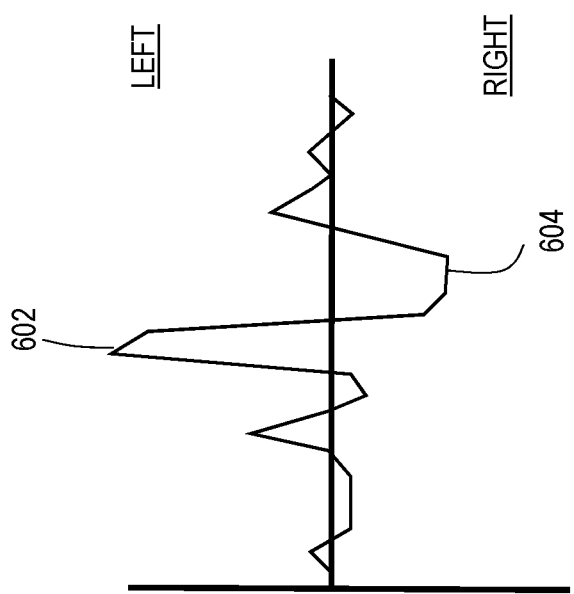

FIGS. 6A and 6B are acceleration charts as produced by inertial measurement unit of the mobile device for determining lane changes by a vehicle while in toll lanes and while approaching a tolling location. Changes to the right or left indicate lane changes. A sufficient deviation in acceleration indicates a change in direction, followed by a similar change upon entering the adjacent lane. Such inertial measurements can be used to determine the lane of travel; if no change is detected, then the vehicle is in one of the central lanes. Otherwise the vehicle will make a lane change that can be detected by the inertial sensing system. In FIG. 6A, the output of an inertial measurement system is plotted, indicating acceleration to the left and right of the direction of movement of the vehicle. There is first an acceleration to the left indicated at peak 602 followed by a second peak 604 to the right, indicating a leftward lane change. In FIG. 6B a first peak 606 followed by a second peak 608 indicate a rightward lane change. Thus, FIG. 6A could indicate, for example, a change from geofence 504a to 504c, and FIG. 6B can represent a change from geofence 504b to 504d. These change indications indicate that the vehicle was in lane 504c or 504d when it passed through the crossing point 507. This lane information is transmitted to the tolling agency or tolling authority by the mobile device along with the crossing time.

Figure 7:
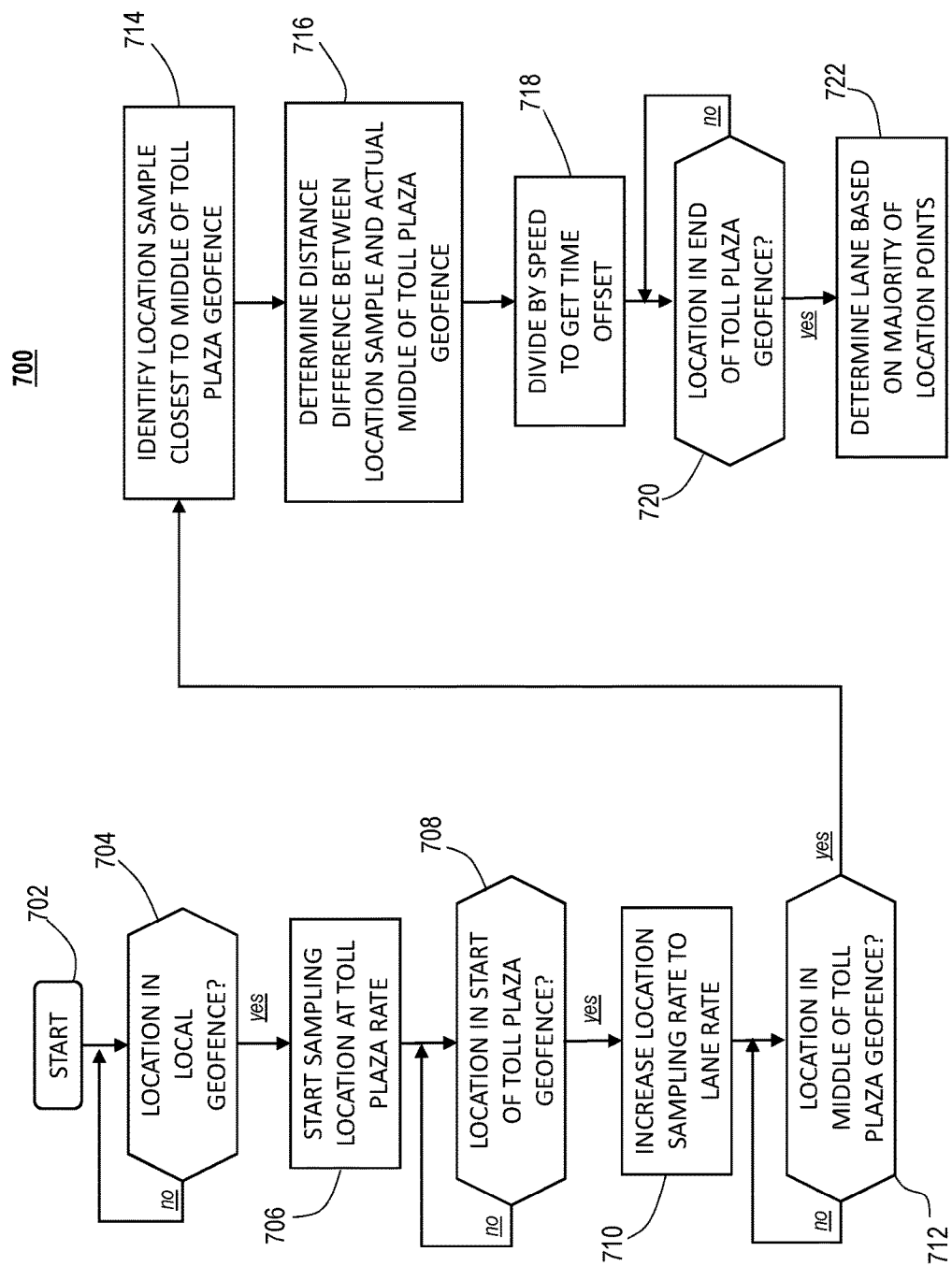
FIG. 7 is a flow chart diagram of a method for determining location of vehicle while passing through a tolling location, in accordance with some embodiments.

FIG. 7 is a flow chart diagram of a method 700 for determining location of vehicle while passing through a tolling location. This method can be used, for example, in lanes such as shown in FIG. 4, where a local geofence region is defined, and lane geofence are defined within the local geofenced region. In particular, the method of FIG. 7 allows the mobile device/tolling app to determine the time at which the vehicle is at the midpoint ("M") or imaging location/crossing point of the geofenced lane. Initially the tolling app infrequently requests a location fix. When a location fix indicates the vehicle is in the local geofence region, which is defined on the toll roadway around the tolling location, the tolling app increases the rate at which location fixes are performed/requested of the satellite location system of the mobile device. Once a location fix falls within a defined toll lane geofence, the location sampling rate may be again increased, and the location fixes are kept in memory. To determine the time of crossing the midpoint, the method takes the location fix closest to the midpoint, and determines the distance offset. The distance offset is divided by the vehicle speed to produce a time offset which can be applied to the time of the closest location fix to determine the time of crossing the midpoint. Furthermore, as the vehicle exits the end of the toll lane geofence, the location fixes, or location markers, taken while in the lane geofence can be correlated to a specific lane to determine which lane the vehicle was in as it passed the midpoint. Then the time of crossing and the lane identifier can be transmitted to the tolling system for using in a method such as that shown in FIGS. 2A, 2B to potentially eliminate the need for a manual review of a tolling image.

At the start 702 the mobile device is executing the tolling app, and the mobile device is operation to provide location fix data on request by the tolling app. Initially the tolling app requests location fixes at a base rate and compares them in step 704 to geofence region definitions, assuming the location fixes indicate that the mobile device/vehicle are within a minimum distance to a tolling location. When the location indicates that the mobile device/vehicle have entered a tolling location geofence, then in step 706 the location sampling rate is increased to an increased sampling rate (e.g. every two hundred meters). In step 708 the tolling app compares location fixes to the lane geofences to determine when the mobile device/vehicle has passed the start of a lane geofence, at which point in step 710 the location sampling rate is increased to a higher rate (e.g. every five meters). In step 712 the method 700 as performed by the tolling app determines if the crossing point has been passed. Once the crossing point has been passed, then in step 714 the tolling app determines which location fix was closest to the defined crossing point of the lane geofence (the start, midpoint, and ends of each lane geofence are predefined and provided to the mobile device). The crossing time is then determined in steps 716, 718. In step 720 the tolling app looks for the end of the lane geofence. Upon reaching the end of the lane geofence, in step 722, the lane is determined based on which lane geofence included the majority of location fixes after passing the start of the lane geofence in step 708.

Figure 8:
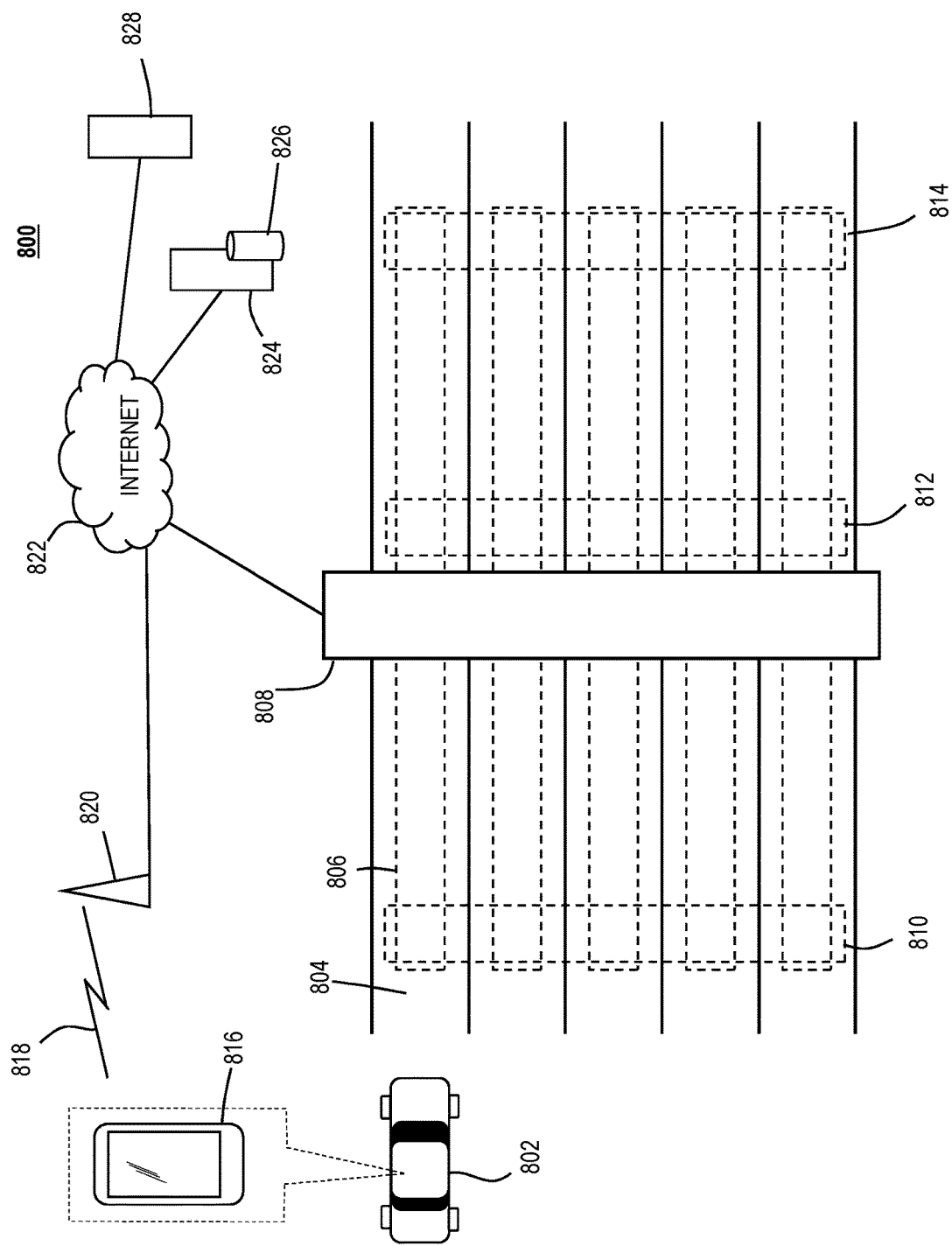
FIG. 8 is a system diagram of a tolling system that compares lane and crossing time records produced by both tolling points and mobile devices in response to vehicles passing through the tolling point, in accordance with some embodiments.

FIG. 8 shows a system diagram of a tolling system 800, in accordance with some embodiments. A vehicle 802 is shown driving on a toll roadway that include a plurality of toll lanes such as toll lane 804 that pass through a toll point 808. Each lane has a defined lane geofence 806 with a larger toll plaza geofence region (not shown). Each toll lane geofence also defines a start 810, middle 812, and end 814. The middle 812 is an image or crossing point where vehicles are located when they are photographed by a camera of the toll point 808 for each lane. A mobile device 816 running a tolling app is located in the vehicle 802, and can communicate, using networked mobile data communication, with a tolling agency data center including, for example, a geofence definition server 824 and a tolling billing server 828. The mobile device communicates with a cellular or other terrestrial network infrastructure 820 that is operably coupled to the internet 822. Accordingly, the mobile device 816 can acquire geofence definitions from the geofence definition server 824, which is coupled to a geofence definition database 86 in which geofence definitions are stored. Each geofence definition includes a set of location parameters defining the location boundary of the geofence, as well as additional features such as the locations of the start 810, middle 812, and end 814 for lane geofences. Thus, the mobile device, executing the tolling app, performs the methods of FIG. 2A or 2B, and FIG. 7 by accessing and obtaining various geofence definitions and comparing the location of the mobile device/vehicle to those definitions as indicated substantially in methods 200A, 200B, 700. Further, the toll point 808 reports lane and crossing times to the billing server 828, and the mobile device 816 also reports lane and crossing time information to the billing server 828 so that the billing server 828 can match lane and crossing time information reported by the mobile device 816 and toll point 808 and bill the appropriate entities. Any lane a crossing time records reported by the toll point 808 that can't be matched are returned or flagged for manual review of the images.

A tolling system has been disclosed that reduces the need for manual review of license plate images taken by toll point cameras by determining crossing time and lane information at both the toll point and by mobile devices in vehicles passing through the toll points, and matching these individually created records. This greatly reduces the number of toll transactions that require manual review of toll point images, especially when there is widespread adoption of the tolling app. It will be appreciated by those skilled in the art that the mobile device can be any device capable of communicating with the toll authority data center, although the ubiquitous cellular phone device will be an obvious choice. Equivalent devices can be used instead, however, including dedicated tolling devices that have their own cellular transceivers, satellite location receiver, accelerometer, and so on, capable of performing the method disclosed herein.

The claims appended hereto are meant to cover all modifications and changes within the scope and spirit of the present invention.

What is claimed is:

1. A method of reducing revenue loss in vehicle tolling, comprising:
   at a tolling location, detecting an approach of a vehicle, wherein the tolling location is one tolling location of a plurality of tolling locations;
   determining a time at which the vehicle passes the tolling location;
   receiving, at a server of a toll agency from a plurality of mobile devices, a plurality of toll event log messages, each one of the plurality of event log messages indicating a particular tolling location of the plurality of tolling locations and a time of passing through the particular tolling location; and
   performing a reconciliation process to determine a toll account associated with the vehicle, and then billing the toll account.

2. The method of claim 1, wherein the reconciliation process comprises:
   determining that one of the plurality of toll event log messages includes a corresponding tolling location and time value matching that of the vehicle passing through the tolling location; and
   determining the toll account associated with the vehicle based on matching the time value and tolling location.

3. The method of claim 2, further comprising:
   responsive to detecting the approach of the vehicle, capturing an image of the vehicle as the vehicle passes the tolling location; and
   responsive to determining the toll account, deleting the image of the vehicle.

4. The method of claim 1, further comprising:
   responsive to detecting the approach of the vehicle, attempting to read a toll transponder in the vehicle at the tolling location; and
   wherein performing the reconciliation process is performed in response to failing to receive a transponder response from the vehicle.

5. The method of claim 1, wherein each one of the plurality of event log messages indicates a lane of the particular tolling location.

6. The method of claim 1, further comprising:
   responsive to detecting the approach of the vehicle, capturing an image of the vehicle as the vehicle passes the tolling location;
   attempting to automatically recognize a license plate number of the vehicle; and
   wherein performing the reconciliation process is performed in response to failing to automatically recognize the license plate number of the vehicle.

* * * * *